US010416381B1

(12) United States Patent
Chen et al.

(10) Patent No.: US 10,416,381 B1
(45) Date of Patent: Sep. 17, 2019

(54) SPOT-SIZE-CONVERTER DESIGN FOR FACET OPTICAL COUPLING

(71) Applicant: Acacia Communications, Inc., Maynard, MA (US)

(72) Inventors: Long Chen, Marlboro, NJ (US); Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/852,982

(22) Filed: Dec. 22, 2017

Related U.S. Application Data

(60) Provisional application No. 62/438,564, filed on Dec. 23, 2016.

(51) Int. Cl.

| | |
|---|---|
| ***G02B 6/12*** | (2006.01) |
| ***G02B 6/122*** | (2006.01) |
| ***G02B 6/30*** | (2006.01) |
| *G02B 6/136* | (2006.01) |

(52) U.S. Cl.
CPC ............... *G02B 6/122* (2013.01); *G02B 6/30* (2013.01); *G02B 6/136* (2013.01)

(58) Field of Classification Search
None
See application file for complete search history.

(56) References Cited

U.S. PATENT DOCUMENTS

| | | | | |
|---|---|---|---|---|
| 4,781,424 A | | 11/1988 | Kawachi et al. | |
| 5,473,721 A | | 12/1995 | Myers et al. | |
| 6,756,185 B2 | * | 6/2004 | Steinberg | G02B 6/136 216/25 |
| 6,866,426 B1 | | 3/2005 | Steinberg et al. | |
| 6,987,898 B2 | | 1/2006 | Tran et al. | |
| 7,724,987 B2 | | 5/2010 | Glebov | |
| 8,285,092 B2 | * | 10/2012 | Deki | G02B 6/305 385/28 |
| 8,326,100 B2 | | 12/2012 | Chen et al. | |
| 8,791,405 B2 | | 7/2014 | Ji et al. | |
| 8,815,704 B2 | | 8/2014 | Meade et al. | |
| 9,136,230 B2 | | 9/2015 | Demin et al. | |
| 9,213,148 B2 | | 12/2015 | Li et al. | |
| 9,523,816 B2 | | 12/2016 | Nakagawa et al. | |

(Continued)

FOREIGN PATENT DOCUMENTS

| | | |
|---|---|---|
| EP | 1 400 822 A2 | 3/2004 |
| EP | 3 091 380 A1 | 11/2016 |

(Continued)

OTHER PUBLICATIONS

International Search Report and Written Opinion dated Mar. 23, 2016 in connection with International Application No. PCT/US2016/012657.

(Continued)

*Primary Examiner* — Michael Stahl
(74) *Attorney, Agent, or Firm* — Joseph D'Angelo

(57) ABSTRACT

A facet optical coupler, and techniques for forming a facet optical coupler, that includes a waveguide disposed in a trench of a substrate are described. The substrate may be a silicon substrate in some embodiments. A cladding material is first disposed in the trench, and the waveguide is disposed on the cladding material in the trench.

20 Claims, 9 Drawing Sheets

(56) References Cited

U.S. PATENT DOCUMENTS 9,568,674 B2 2/2017 Sandhu et al.
9,618,699 B2 4/2017 Tummidi et al.
9,703,038 B1 7/2017 Chen
9,922,887 B2 3/2018 Vermeulen et al.
10,031,292 B2 7/2018 Chen
2001/0053260 A1* 12/2001 Takizawa ........... G02B 6/12002 385/14
2002/0041739 A1 4/2002 Wu
2003/0015770 A1* 1/2003 Talin .................. G02B 6/12004 257/622
2003/0081922 A1* 5/2003 Ide ......................... G02B 6/132 385/129
2003/0123833 A1* 7/2003 Ricks ..................... G02B 6/132 385/137
2004/0042729 A1 3/2004 Zhou et al.
2004/0057667 A1 3/2004 Yamada et al.
2006/0275004 A1 12/2006 Fujii et al.
2009/0022457 A1 1/2009 de Jong et al.
2009/0274418 A1 11/2009 Holzwarth et al.
2009/0297093 A1 12/2009 Webster et al.
2010/0040327 A1 2/2010 Deki et al.
2010/0220957 A1* 9/2010 Asahi ..................... G02B 6/423 385/39
2011/0103737 A1* 5/2011 Kim ..................... G02B 6/1221 385/14
2011/0116741 A1 5/2011 Cevini et al.
2011/0133063 A1 6/2011 Ji et al.
2011/0188828 A1* 8/2011 Kang ....................... G02B 6/02 385/131
2012/0076465 A1 3/2012 Chen et al.
2012/0219249 A1 8/2012 Pitwon
2012/0241600 A1 9/2012 Lee et al.
2012/0314993 A1* 12/2012 Kang ..................... G02B 6/305 385/14
2013/0015546 A1 1/2013 Joe et al.
2013/0322811 A1 12/2013 Meade
2013/0322813 A1 12/2013 Grondin et al.
2013/0322816 A1* 12/2013 Takahashi ............ G02B 6/1228 385/27
2013/0336346 A1 12/2013 Kobrinsky et al.
2014/0294341 A1 10/2014 Hatori et al.
2015/0063747 A1 3/2015 Chen et al.
2015/0293299 A1 10/2015 Xu et al.
2015/0316719 A1 11/2015 Nakagawa et al.
2015/0346431 A1 12/2015 Budd et al.
2016/0178861 A1 6/2016 Osenback et al.
2016/0202414 A1 7/2016 Englund et al.
2016/0202421 A1 7/2016 Chen
2016/0327742 A1* 11/2016 Collins ................ G02B 6/1228
2017/0052318 A1 2/2017 Hofrichter et al.
2017/0108643 A1 4/2017 Budd et al.
2017/0285265 A1 10/2017 Chen
2017/0293073 A1 10/2017 Chen et al.
2017/0343734 A1 11/2017 Collins et al.
2018/0003899 A1 1/2018 Doerr et al.

FOREIGN PATENT DOCUMENTS

JP 53-010445 A 1/1978
JP 7-142807 A * 6/1995
JP 2009-192842 A 8/2009
WO WO 02/079831 A1 10/2002
WO WO 2009/134691 A1 11/2009

OTHER PUBLICATIONS

International Preliminary Report on Patentability dated Jul. 20, 2017 in connection with International Application No. PCT/US2016/012657.

Chen et al., Low-Loss and Broadband Cantilever Couplers Between Standard Cleaved Fibers and High-Index-Contrast $Si_3N_4$ or Si Waveguides. IEEE Photon Tech Lett. Dec. 1, 2010;22(23):1744-6.

International Search Report and Written Opinion dated Jun. 12, 2017 for Application No. PCT/US2017/026572.

International Preliminary Report on Patentability dated Oct. 18, 2018 in connection with International Application No. PCT/US2017/026572.

Singaporean Search Report and Written Opinion dated May 24, 2018 in connection with Application No. 11201705526R.

* cited by examiner

SPOT-SIZE-CONVERTER DESIGN FOR FACET OPTICAL COUPLING

RELATED APPLICATIONS

The present application claims the benefit under 35 U.S.C. § 119(e) of U.S. Provisional Patent Application Ser. No. 62/438,564 entitled "SPOT-SIZE-CONVERTER DESIGN FOR FACET OPTICAL COUPLING," filed Dec. 23, 2016, which is hereby incorporated herein by reference in its entirety.

BACKGROUND

Field

The present application relates to a spot size converter design for facet optical coupling and related apparatus and methods.

Related Art

A photonic integrated circuit includes optical components integrated on a substrate. A facet optical coupler can couple an external optical component, such as an optical fiber, to a waveguide of a photonic integrated circuit via an edge of the substrate.

BRIEF SUMMARY

According to an aspect of the application, an optical facet coupler is provided. The optical facet coupler has a substrate having a trench. A cladding material is disposed in the trench. A waveguide is disposed on the cladding material.

According to a second aspect of the application, a method of manufacturing an optical facet coupler is provided. The method comprises forming a trench in a substrate. The method further comprises forming a cladding material in the trench. The method further comprises forming a waveguide on the cladding material.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
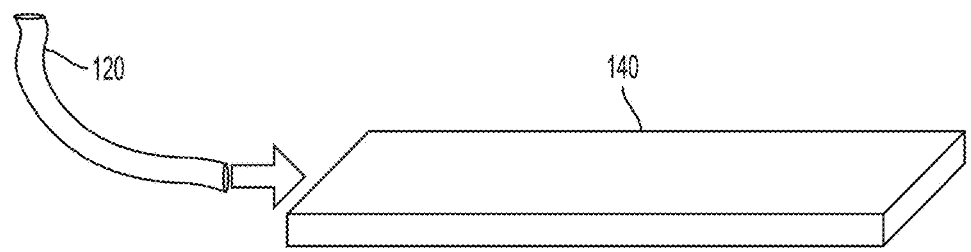
FIG. 1 is a diagram of an optical fiber connecting to a photonic integrated circuit, according to a non-limiting embodiment.

Aspects of the present application provide spot size converters for facet optical coupling. Photonics chips, such as silicon photonics chips, sometimes include facet couplers for communicating optical signals with an external component. For example, an optical fiber may be coupled to the chip facet in some embodiments. In other embodiments, one photonics chip may be coupled with another photonics chip, or with a laser chip. The photonics chip may include a spot size converter to facilitate the coupling.

Aspects of the present application provide for an optical waveguide spot size converter disposed in a trench in a substrate of a photonics chip. In some embodiments, the waveguide conforms to the trench contour. In some such embodiments, the waveguide may be formed by depositing a suitable waveguide material and planarizing the deposited material. In some embodiments, the waveguide does not conform to the trench contour, but rather is patterned to define a waveguide cross-section differing from that of the trench. In at least some embodiments, a cladding material is deposited in the trench prior to forming the waveguide core, and another cladding material is deposited after forming the waveguide core. In some embodiments, the waveguide couples to one or more additional waveguides in the photonics chip.

In at least some embodiments, disposing the waveguide of a spot size converter, or more generally of a facet coupler, in the trench avoids fabrication and operational challenges associated with alternative constructions of disposing the waveguide above the substrate. Disposing the waveguide above the substrate of the photonics chip may lead to relatively more complicated designs to avoid light leakage into the substrate, can result in mechanical cracking, and can limit the ability to flexibly alter the design of other components on the photonics chip. By contrast, forming the waveguide in a trench of the substrate may reduce the number of fabrication steps to form the waveguide. In some embodiments, forming the waveguide in the trench may allow for altering the waveguide design early in the fabrication process such that other features of the photonics chip to be formed subsequently may be formed without redesign. In some embodiments, forming the waveguide in the substrate may avoid undesirable thermomechanical stresses sometimes associated with cantilevered spot size converters. In some embodiments, forming the waveguide in the substrate may facilitate materials processing control across a substrate or wafer.

Aspects of the present application provide structures, chip designs, and manufacturing processes suitable for accommodating changes to the structures being formed (e.g., waveguide and/or other related component changes). Moreover, aspects of the present application also provide structures, chip designs, and manufacturing processes suitable for controlling material properties such that they do not vary uncontrollably across fabrications. In at least some aspects of the present application, rather than building a waveguide separate from the substrate (e.g., by suspending the waveguide from the substrate using a second substrate), the waveguide is built into the substrate itself by etching a trench into the substrate. By building the waveguide in the substrate, the waveguide can be built early in the fabrication process (e.g., at the beginning of the fabrication process), which can allow for easy changes in the size of the waveguide. For example, the waveguide can be built with a large diameter to match the fiber mode of the optical fiber that is being coupled to the spot size converter. Having the waveguide in the substrate also avoids the need to have a thick waveguide on top, resulting in topological difficulties, which impacts processing, handling, and reliability.

Applicants have appreciated that incorporating techniques that provide for easier process changes to vary the optical mode field size of a waveguide of a facet optical coupler may provide a desired level of coupling with an optical fiber and/or one or more additional waveguides of the integrated device. Accordingly, aspects of the present application provide a spot size converter for use in a silicon photonics (SiPh) chip. The spot size converter may include a substrate and a waveguide core disposed in a trench in the substrate. One or more cladding layers may optionally contact the top, bottom, and/or sides of the waveguide core. In some embodiments, the core is formed as a stack of layers of multiple material types. In some embodiments, the coupling waveguide couples to a second waveguide disposed in an upper-cladding layer that separates the coupling waveguide from the second waveguide. In some embodiments, the coupling waveguide overlaps at least partially with the second waveguide in a vertical direction so that light propagates from the coupling waveguide, through the upper-cladding material between the coupling and second waveguides, and to the second waveguide. In some embodiments, the second waveguide couples to a third waveguide disposed below the upper-cladding layer, which separates the second waveguide from the third waveguide. In some embodiments, the second waveguide overlaps at least partially with the third waveguide in a vertical direction so that light propagates from the second waveguide, through the upper-cladding material between the second and third waveguides, and to the third waveguide.

The aspects and embodiments described above, as well as additional aspects and embodiments, are described further below. These aspects and/or embodiments may be used individually, all together, or in any combination of two or more, as the application is not limited in this respect.

FIG. 1 is a diagram of an optical fiber 120 connecting to a photonic integrated circuit (PIC) 140, according to a non-limiting embodiment. PIC 140 can include optical components such as optical waveguides, modulators, amplifiers, or other components, some of which may have submicron dimensions. Such optical waveguides and components are described further herein. Coupling the optical fiber 120 to such a submicron waveguide can be challenging due to a mismatch in mode field size between the optical fiber and the waveguide. For example, a standard single-mode optical fiber has a mode field diameter (MFD) of approximately 10 microns, while a silicon submicron waveguide may have a mode field diameter of less than 1 micron. The techniques described herein provide, in some embodiments, spot size converters in the PIC 140 that interface with the optical fiber 120 to convert from the mode field size of the optical fiber and the main waveguide. The spot size converters can also be used to couple to other PICs or free-space optics.

Figure 2:
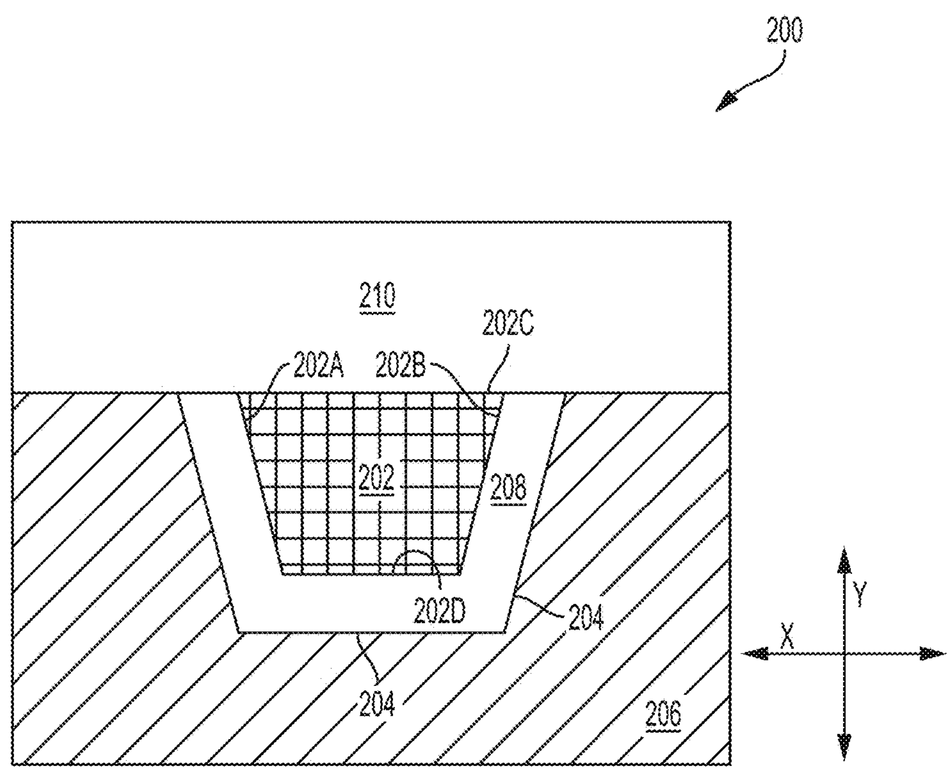
FIG. 2 is a cross-sectional diagram of a spot size converter, according to a non-limiting embodiment.

FIG. 2 is a cross-sectional diagram of a spot size converter 200, according to a non-limiting embodiment. The spot size converter 200 includes a waveguide 202 that is formed in a trench 204 that is formed in the substrate 206. The waveguide 202 may be a coupling waveguide that may couple both to an optical fiber (e.g., the optical fiber 120) at a facet of the substrate 206 and a primary waveguide of a PIC on the integrated device. In some embodiments, the waveguide 202 couples to one or more intermediate waveguides that ultimately couple to the primary waveguide of the PIC. For example, the waveguide 202 can couple to an intermediate, second waveguide that connects to a third, primary waveguide of a PIC on the integrated device (e.g., as discussed further below in conjunction with FIGS. 5-6). The trench includes a lower-cladding material 208 disposed in the trench 204, such that the waveguide 202 is disposed on the lower-cladding material 208. As shown, the waveguide 202 includes first and second sides 202A and 202B, an upper surface 202C and a lower surface 202D. The lower-cladding material 208 conforms to the contour of the trench 204. The lower-cladding material 208 contacts the first side 202A, second side 202B and the lower surface 202D of the waveguide 202. The substrate 206, the lower-cladding material 208, and the waveguide 202 form a substantially planar surface. An upper-cladding material 210 is disposed over the substrate 206, the top portion of the lower-cladding 208, and the upper surface 202C of the waveguide 202.

Various materials may be used for the illustrated structures. For example, in some embodiments the lower-cladding material 204 comprises a dielectric material, such as $SiO_2$. In some embodiments, the waveguide 202 comprises a material with a higher refractive index than the lower-cladding material 204. The waveguide 202 can be made of any suitable dielectric material, including a material having the form $Si_xO_yN_z$. Examples of such materials include silicon, silicon oxynitride (e.g., SiON), silicon dioxide (e.g., $SiO_2$) and silicon nitride (e.g., $Si_3N_4$) by way of example and not limitation. In some embodiments, the upper-cladding 210 is made of a material with a refractive index lower than that of the waveguide 202. For example, the upper-cladding 210 can be made of $SiO_2$, air, and/or any other suitable material. While FIG. 2 illustrates the lower-cladding material 208 separate from the upper-cladding material 210, this is for illustrative purposes only. In some embodiments, the lower and upper-cladding materials 208, 210 may be formed of different cladding materials and/or may be formed of the same cladding material (e.g., an oxide such as $SiO_2$).

The waveguide 202 may be sized and shaped to couple with an external (off-chip) optical component, such as an optical fiber or a waveguide of another integrated optical device. For example, the waveguide 202 may be sized and shaped to couple with an optical fiber positioned at an edge (or facet) of the PIC (e.g., as shown in FIG. 1). The optical mode field size of the waveguide 202 may be defined by the dielectric material used to form the waveguide 202 and/or one or more dimensions of the waveguide 202 (e.g., dimensions at an end of the waveguide proximate the edge). Varying the size and shape of the waveguide 202 can alter the size of the optical mode field. The size of waveguide 202 in a direction perpendicular to the propagation of light may define a mode size of waveguide 202. The material of waveguide 202 and a size of waveguide 202 may define a vertical mode field size of the waveguide 202.

In some embodiments, the dimensions of the waveguide 202 are approximately 5 um wide (in the X dimension) and 5 um high (in the Y dimension), such that the waveguide 202 is generally 5 um×5 um. As shown, the waveguide 202 may not have a width that is uniform in the vertical direction due to slanted side-walls. In some embodiments, the width in the X dimension refers to a mid-point width of the waveguide 202 along the height of the waveguide 202 (in the Y direction). In some embodiments, the width in the X direction can represent a largest width of the waveguide 202, a smallest width of the waveguide 202, and/or the like. In some embodiments, the waveguide 202 has a uniform width. The waveguide 202 can be designed to be 5 um×5 um, for example, to allow the spot size converter 200 to interface with an optical fiber with a mode diameter of 8-10 um. In some embodiments, the dimensions of the waveguide 202 can be bigger than 5 um. For example, the dimensions of the waveguide 202 can be approximately 9 um in the X and Y dimensions. This can be done, for example, if the refractive index between the waveguide 202 and upper-cladding 210 is high, since a 9×9 um waveguide can to couple efficiently to an optical fiber. In some embodiments, the dimensions of the waveguide 202 are smaller than 5 um. For example, the dimensions of the waveguide 202 can be approximately 4 um in the X and Y dimensions. This can be done, for example, if the refractive index of the waveguide 202 is only slightly higher than the lower-cladding 208 and the upper-cladding 210, such that a smaller waveguide 202 (e.g., 4 um) can still provide a large mode. The shape of the waveguide 202 is discussed further in conjunction with FIG. 5.

Figure 3:
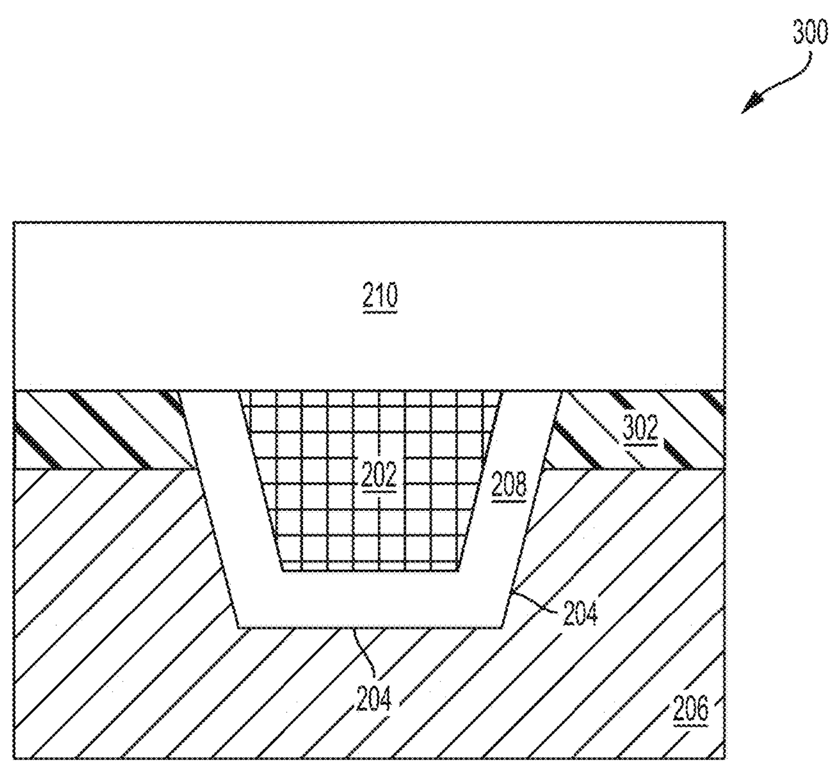
FIG. 3 is a cross-sectional diagram of a spot size converter, according to a non-limiting embodiment.

FIG. 3 is a cross-sectional diagram of a spot size converter 300, according to a non-limiting embodiment. The spot size converter 300 includes many of the same components as shown in FIG. 2, including the waveguide 202 deposited on the lower-cladding material 208, which is deposited in the trench 204 in the substrate 206. The spot size converter 300 also includes the upper-cladding material 210. FIG. 3 also shows an additional layer 302 disposed on top of the substrate 206 and below the upper-cladding material 210. The trench 204 extends through the additional layer 302 and into the substrate 206. The upper-cladding material 210 is deposited over the top surfaces of the additional layer 302, the lower-cladding 208, and the waveguide 202.

The additional layer 302 can include one or more layers. For example, the additional layer 302 can include a silicon layer, wherein the trench extends through the silicon layer and into the substrate. As another example, the additional layer 302 can include a buried thermal oxide layer (e.g., a barium oxide (BaO) layer), and/or a buried dielectric layer of a SOI wafer (e.g., a $SiO_2$ layer), that is under a second silicon layer disposed between the layer 302 and the upper-cladding material 210. The components may be of any of the types of materials described in connection with FIG. 2.

Figure 4:
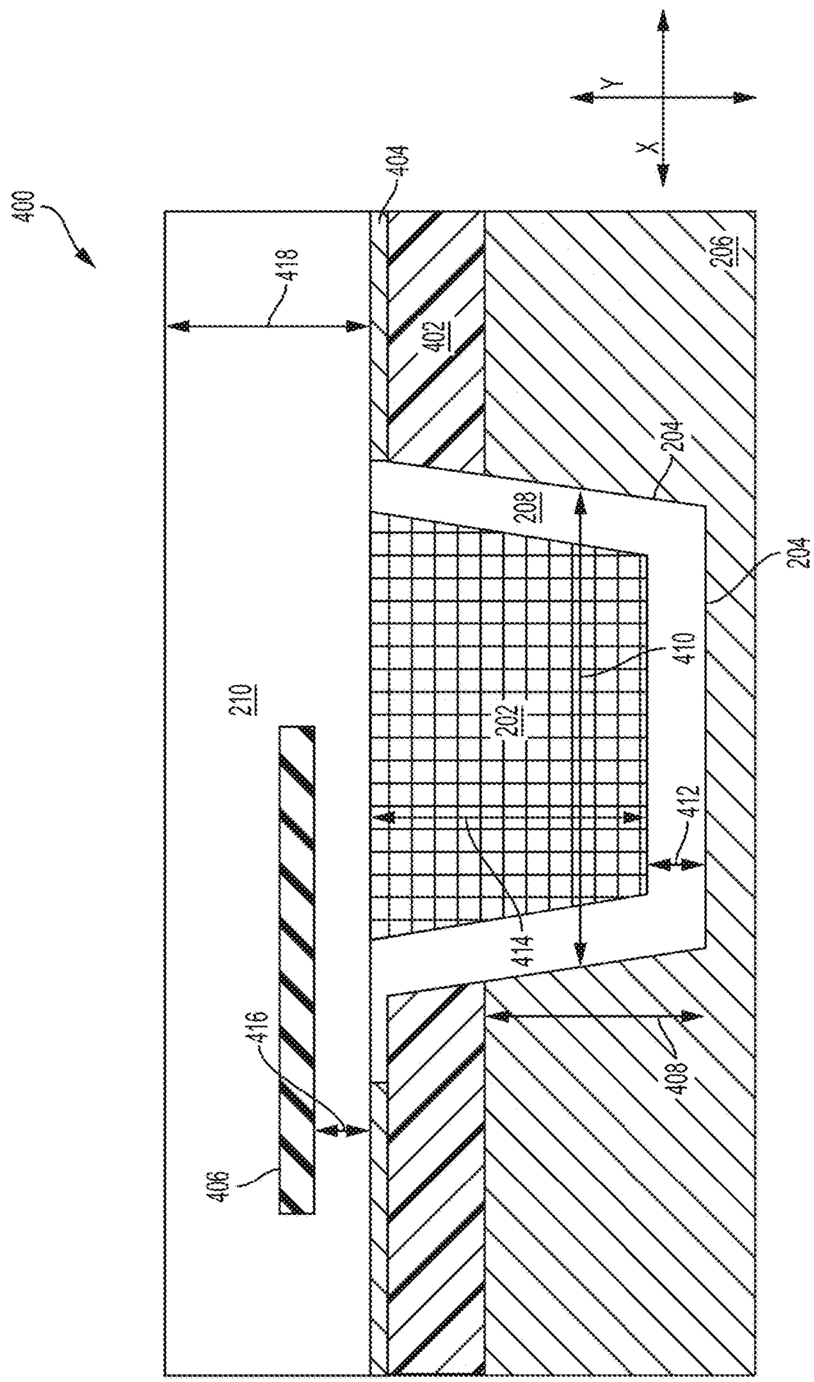
FIG. 4 is a cross-sectional diagram of a spot size converter, according to a non-limiting embodiment.

FIG. 4 is a cross-sectional diagram illustrating the relative vertical positioning of certain components of a spot size converter 400, according to a non-limiting embodiment. The spot size converter 400 includes components shown in FIGS. 2-3, including the waveguide 202, the trench 204, the substrate 206, the lower-cladding material 208, and the upper-cladding material 210. The spot size converter 400 includes a first layer 402 disposed on top of the substrate 206, and a second layer 404 disposed on top of the first layer 402 and below the upper-cladding material 210. In some embodiments, these first and second layers 402, 404 could be silicon diode and silicon, respectively, from a SOI wafer. In some embodiments, a third waveguide can be formed in the second layer 404, as discussed further in conjunction with FIG. 5. In some embodiments, such a third waveguide is the primary waveguide of the photonic circuit away from the coupling region. The trench 204 extends through the first layer 402 and the second layer 404 and into the substrate 206. The upper-cladding material 210 is deposited on the top portions of the second layer 404, possibly portions of the first layer 402, the lower-cladding 208, the waveguide 202. The spot size converter 400 also includes a second waveguide 406 disposed in the upper-cladding material 210. The components shown in FIG. 4 are not an accurate representation of the physical layout of the components. Rather, FIG. 4 is intended to show the relative vertical layers of the spot size converter 400.

The components shown in FIG. 4 can be designed with various sizes and dimensions. A non-limiting example of dimensions is described below. Some dimensions are illustrated using associated arrows and reference characters, while other dimensions are discussed with reference to the width of the spot size converter 400 (in the X dimension) and/or height, or depth, of the spot size converter 400 (in the Y dimension). The trench 204 can extend into the substrate a distance shown by arrow 408. In some embodiments, the depth of the trench 204 can range from 1 um to 15 um, for example. For example, the depth can be 8 um in a non-limiting example. The width of the trench 204 can extend as shown by arrow 410. In some embodiments, the width of the trench 204 can range from 6 um to 20 um for example. For example, it can be 14 um in a non-limiting example. The depth (or thickness) of the lower-cladding material 208 can extend as shown by arrow 412. In some embodiments, the depth of the lower-cladding material 208 can range from 0.5 um to 5 um for example. For example, it can be 2 um in a non-limiting example. The depth of waveguide 202 can extend as shown by arrow 414. The depth of waveguide 202 can range, as discussed herein, from 3 um to 10 um. In a non-limiting example, the depth of the waveguide 202 can be 9.2 um. In some embodiments, the depth of the first layer 402 can range from 0.5 um to 5 um for example. For example, it can be 3 um in a non-limiting example. In some embodiments, the height of the second layer 404 can range from 0.1 um to 3 um for example. For example, it can be 0.22 um in a non-limiting example. The space between the second layer 404 and the second waveguide 406 can extend as shown by arrow 416. In some embodiments, the space between the second layer 404 and the second waveguide 406 can range from 0.05 um to 2 um for example. For example, it can be 0.25 um in a non-limiting example. In some embodiments, the depth of the second waveguide 406 can range from 0.1 um to 3 um for example. For example, it can be 0.3 um in a non-limiting example. The depth of the upper-cladding material 210 to the second layer 404 can extend as shown by arrow 418. In some embodiments, the depth of the upper-cladding material 210 to the second layer 404 can range from 1 um to 10 um for example. For example, it can be 6 um in a non-limiting example.

The space between the top of the waveguide 202 and the second waveguide 406 can also be the same space as shown by arrow 416. In some embodiments, the space is slightly different due to fabrication requirements. In some embodiments, the space between the top of the waveguide 202 and the second waveguide 406 range from 0 to 2 um for example. For example, it can be 0.25 um, in a non-limiting example. This space, or depth, may provide a desired level of coupling between waveguide 202 and the second waveguide 406. In some embodiments, the distance between the waveguide 202 and the second waveguide 406 is zero and the two waveguides are in contact.

The components may be of any of the types of materials described in connection with FIGS. 2-3. In some embodiments, the first layer 402 is a buried oxide (BOX) layer of a silicon on insulator substrate, such that the substrate has a base substrate layer (e.g., a base silicon layer), a BOX layer above the base substrate layer, and a silicon device layer above the BOX layer. In some embodiments, the second layer 404 is made of any suitable material such as that described in conjunction with the additional layer 302 in FIG. 3. For example, the second layer 404 can be a silicon device layer and the first layer 402 can be a BOX layer. In some embodiments, the second waveguide 406 is made of any suitable material such as that described in conjunction with the waveguide 202. In some embodiments, the second waveguide 406 is made of silicon nitride ($Si_3N_4$). Waveguide 406 extends over a portion of waveguide 202 along its length into the page. Waveguide 406 may be centered above waveguide 202 from the cross-section view shown in FIG. 4.

Figure 5:
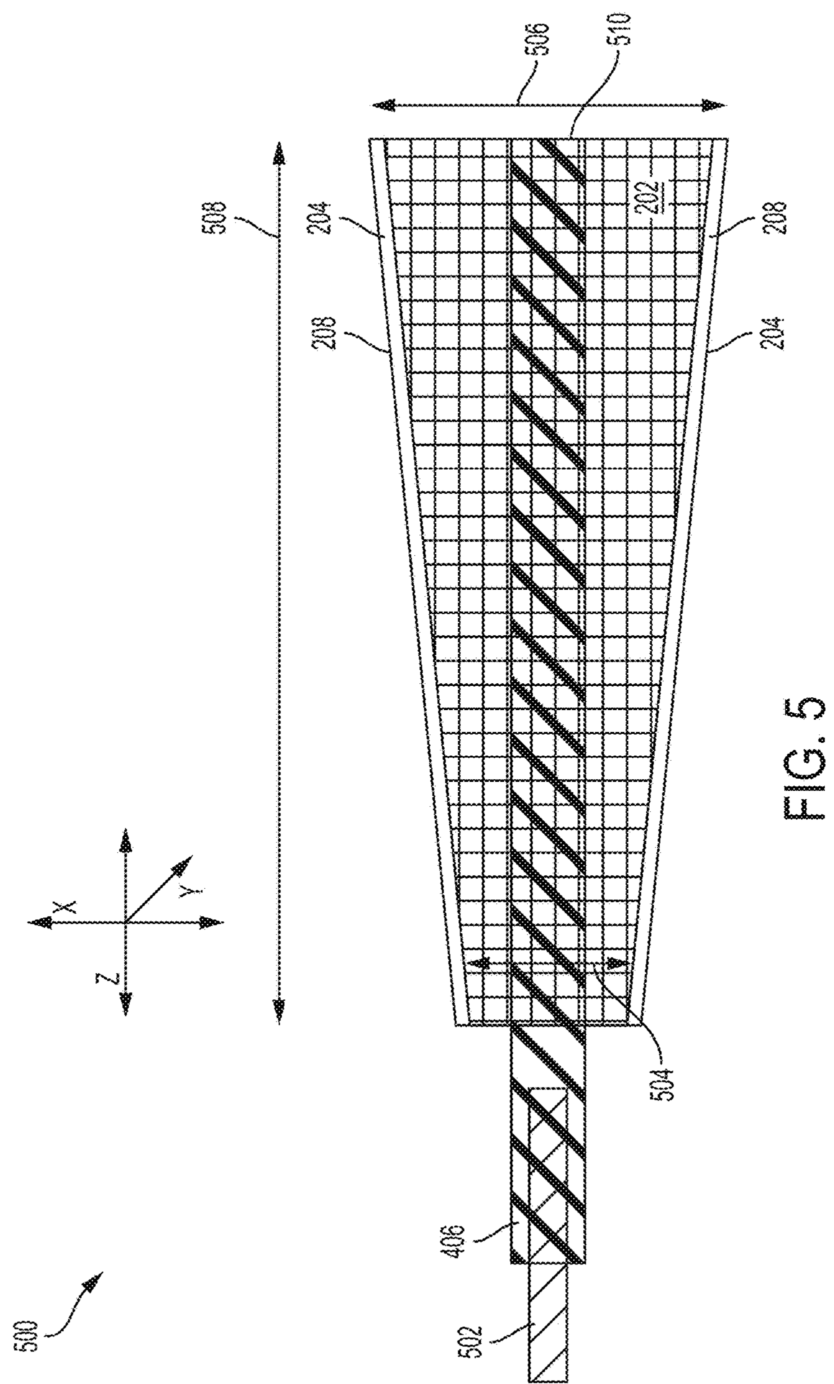
FIG. 5 is a top view of certain components of the spot size converter illustrated in FIG. 4, according to a non-limiting embodiment.

FIG. 5 is a top view 500 of certain components of the spot size converter illustrated in FIG. 4, according to a non-limiting embodiment. The top view 500 shows the waveguide 202, the trench 204, the lower-cladding material 208, and the second waveguide 406 described in FIGS. 2 and 4. As shown, the lower-cladding material 208 separates the left and right sides of the waveguide 202 from the trench 204. As also shown, the waveguide 202 extends the entire length of the trench 204. The top view 500 further shows a third waveguide 502 and a facet 510. The second waveguide 406 overlaps with both the first waveguide 202 and the third waveguide 502. The third waveguide 502 may be a primary waveguide of a PIC. The third waveguide 502 may be formed of any suitable material, including silicon. Where the second waveguide 406 overlaps with the first waveguide 202, the cross-section of the first waveguide 202 is larger than the cross section of the second waveguide 406. Where the second waveguide 202 overlaps with the third waveguide 502, the cross-section of the first waveguide is larger than the cross-section of the third waveguide. In some embodiments, these cross-sections may be configured differently (e.g., such that the cross-section of the first waveguide 202 is smaller than the cross-section of the second waveguide 406).

The mode field size of the waveguide 202 may depend on a dimension of the waveguide 202 in a direction perpendicular to the direction of propagation of light (e.g., a dimension that runs along the x-dimension and y-dimension, which is into the plane of the drawing. The variation in the dimension along waveguide 202 may occur as a tapering of the width of the waveguide 202 in the x-dimension along the z-dimension of waveguide 202. The taper may have any suitable profile, including a linear profile or an exponential profile, as non-limiting examples. The length of the taper may depend on the mode field sizes at either end of the taper to provide a tapering of the coupling waveguide in a manner that reduces optical loss.

In the non-limiting embodiment shown in the top view 500, the trench 204, lower-cladding material 208, and waveguide 202 include a trapezoidal shape. The trench 204 (and therefore the waveguide 202 and lower-cladding material 208) can be sized of various dimensions. In some embodiments, the width of a first end of the trench 204 can extend as shown by arrow 504, the width of a second end of the trench 204 can extend as shown by arrow 506, and the overall length of the trench 204 can extend as shown by arrow 508. According to a non-limiting example, the width of a first end of the trench 204 can range from 3 um to 10 um. The width of a first end of the trench 204 can be 7 um. According to a non-limiting example, the width of a second end of the trench 204 can range from 10 um to 25. The width of the a second end of the trench 204 can be 14 um. The overall length of the trench 204 can range from 0.3 mm to 5 mm. Although the top view 500 shows an exemplary tapering of waveguide 202 where the dimension of the first end is smaller than the dimension of the second end, some embodiments include a coupling waveguide where the width of the first end is larger than the length of the second end and/or where the first and second ends have a same dimension. In some embodiments, the height of the waveguide 202 in the y-dimension is constant along the propagation axis (e.g., the z axis). In some embodiments, the height of the waveguide 202 in the y-dimension varies along the propagation axis. For example, in some fabrication processes, the etch depth of the trench 204 can be dependent on the width of the trench 204. If the width of the trench 204 along the x-dimension is tapering, then the depth of the trench 204 and the height of the waveguide 202 can also taper in the x-dimension. In some embodiments, such lateral (x axis) and vertical (y axis) tapering of the waveguide 202 dimensions can be beneficial in converting the mode size of the waveguide 202 to obtain more efficient optical coupling.

While the second waveguide 406 is shown extending across the entire length of the trench 204, in some embodiments the second waveguide 406 only extends over a portion of the trench 204. For example, the second waveguide 406 may extend and stop at approximately halfway through the trench 204, and/or at any other suitable distance from the facet 510. Although the top view 500 shows the width of the second waveguide 406 is constant along the propagation axis, in some embodiments, the width of the second waveguide 406 can be tapered so that it is narrower at the end proximate to the facet 510, and it is wider at the end distal to the facet 510. The tapering can be linear, exponential, and/or any other form of tapering.

Figure 6:
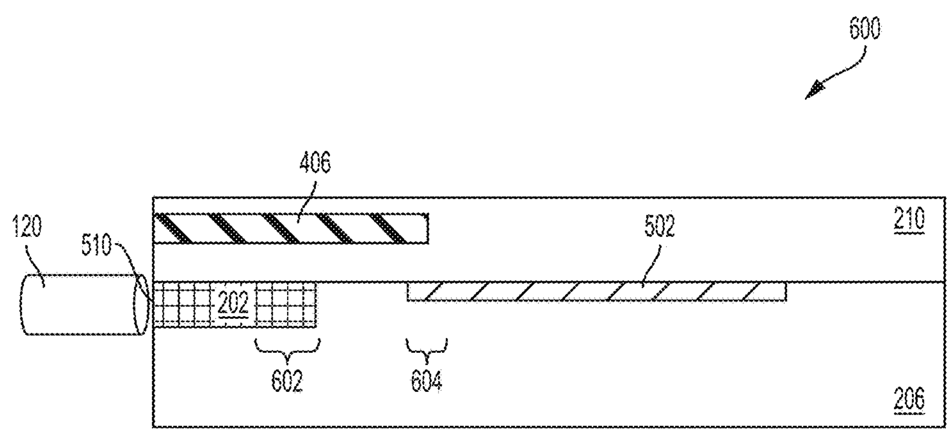
FIG. 6 is a side view of certain components of the spot size converter illustrated in FIGS. 4-5, according to a non-limiting embodiment.

FIG. 6 is a side view 600 of certain components of the spot size converter illustrated in FIGS. 4-5, according to a non-limiting embodiment. The side view 600 shows the waveguide 202 (the trench 204 is omitted for illustrative purposes), the substrate 206, and the upper-cladding layer 210. The side view 600 also shows the second waveguide 406 and the third waveguide 502. Also shown is the optical fiber 120 from FIG. 1 positioned proximate to the waveguide 202 at facet 510. The waveguide 202 and the third waveguide 502 are disposed in the substrate 206. The second waveguide 406 is disposed in the upper-cladding layer 210. A portion of the waveguide 202 overlaps with a portion of the second waveguide 406 in the vertical direction, as indicated by 602. A portion of the second waveguide 406 overlaps with a portion of the third waveguide 502 in the vertical direction, as indicated by 604. The upper-cladding material 210 separates the waveguide 202 from the second waveguide 406, and separates the second waveguide 406 from the third waveguide 502. The waveguide 202 and the third waveguide 502 are separated by a portion of the substrate 206.

The space between the second waveguide 406 and the top of the third waveguide 502 can be configured to different depths. For example, the space between the second waveguide 406 and the top of the third waveguide 502 can range from 0 to 1 um. For example, it can be 0.25 um as a non-limiting example. This space may provide a desired level of coupling between the second waveguide 406 and the third waveguide 502. In some embodiments, the distance between the second waveguide 406 and the third waveguide 502 is zero and the two waveguides are in contact.

The spot size converter may be used as an optical input or an optical output by changing the direction of light propagation. For example, when used as an optical input, light from the optical fiber 120 (or other external optical component) enters the waveguide 202. The light from the waveguide 202 propagates into the second waveguide 406 through the portion of the upper-cladding layer 210 between the waveguide 202 and the second waveguide 406. The light then propagates through the second waveguide 406 and into the third waveguide 502 through the portion of the upper-cladding layer 210 between the second waveguide 406 and the third waveguide 502. Thus, in this exemplary, non-limiting embodiment, the light from the optical fiber 120 makes two optical transitions to reach the third waveguide 502, namely a first transition from the waveguide 202 to the second waveguide 406, and a second transition from the second waveguide 406 to the third waveguide 502. As another example, when used as an optical output, the light traverses the opposite path from the third waveguide 502 to the second waveguide 406 (through the upper-cladding layer 210), from the second waveguide 406 to the waveguide 202 (through the upper-cladding layer 210), and from the waveguide 202 to the optical fiber 120 (or other external optical component) via the facet 510.

Figure 7:
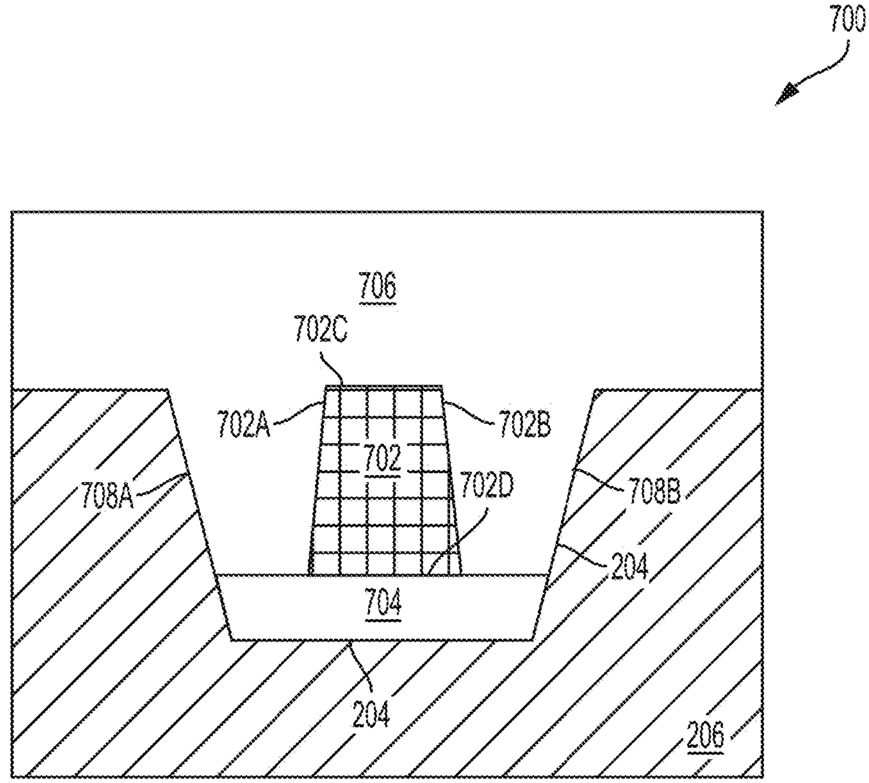
FIG. 7 is a cross-sectional diagram of a spot size converter, according to a non-limiting embodiment.

FIG. 7 is a cross-sectional diagram of a spot size converter 700, according to a non-limiting embodiment. The spot size converter 700 includes a waveguide 702 disposed in the trench 204 in the substrate 206. The waveguide 702 comprises first and second sides 702A and 702B, an upper surface 702C and a lower surface 702D. The lower-cladding material 704 is below the waveguide 702, and does not contact sides 702A or 702B of the waveguide 702. The upper-cladding material 706 is formed to cover the upper surface 702C and the sides 702A and 702B of the waveguide 702, as shown.

Figure 8:
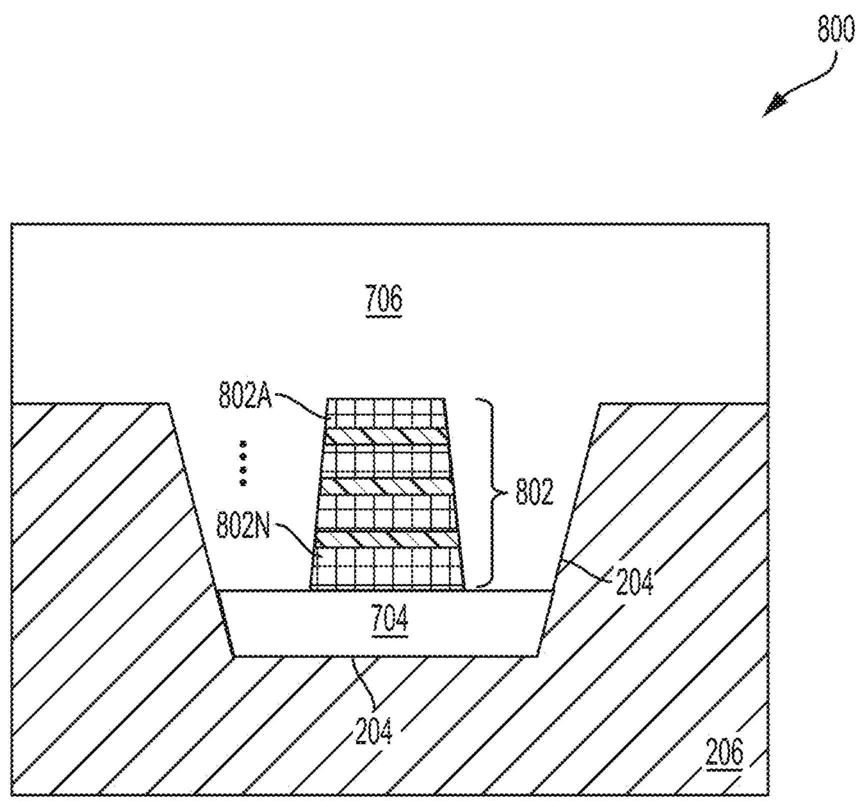
FIG. 8 is a variation of the spot size converter shown in FIG. 7, according to a non-limiting embodiment.

FIG. 8 is a variation of the spot size converter shown in FIG. 7, according to a non-limiting embodiment. The spot size converter 800 shown in FIG. 8 includes the substrate 206, the trench 204, the lower cladding 704, and the upper-cladding shown in FIG. 7. In some embodiments described above, the waveguide (e.g., the waveguide 202 in FIG. 2 and/or the waveguide 702 in FIG. 7) is generally a single material, such as a single dielectric material. In some embodiments, as shown in FIG. 8, the waveguide 802 may be formed through as stack of multiple layer of different materials, such as multiple different dielectric materials, shown in FIG. 8 as layers 802A through 802N.

In some embodiments, the sides of the waveguides 702, 802 can be shaped independently of the sides of the trench 204, such as by tapering the sides of the waveguide independently of the shape of the trench. In some embodiments, as shown in FIGS. 7 and 8, the sides of the waveguide are not parallel to the corresponding sides of the trench 204. For example, referring to FIG. 7, the first and second sides 702A and 702B of the waveguide 702 are not parallel to the first and second sides of the trench 204 (illustrated as trench sides 708A and 708B). FIGS. 7 and 8 show examples of a waveguides 702, 802 in a trench 204 that do not conform to the shape of the trench 204. In some embodiments, a wider trench 204 may be used and the waveguide 702, 802 can be etched, as desired, to define the waveguide separately from the trench 204 (as described further below in conjunction with FIG. 9).

The number of layers and the number of material types may be selected to provide desired optical operating characteristics, as an example. For example, it may be desirable for the waveguide 802 to have a higher index of refraction than the upper-cladding material 706 and/or the lower-cladding material 704. For example, if the cladding materials 704 and/or 706 have a refractive index of approximately 1.45, the refractive index of the waveguide 802 is sufficient if it has a refractive index of 1.5 or 1.6. If a higher index material is used for certain layers of the waveguide 802 (e.g., silicon nitride $Si_3N_4$ with a refractive index of approximately 2), the index can be controlled by layering the higher index material with a lower index material. Therefore, the layers of the waveguide with the high refractive index material can be sandwiched with layers with a lower refractive index to achieve a refractive index of approximately 1.5 or 1.6.

Figure 9:
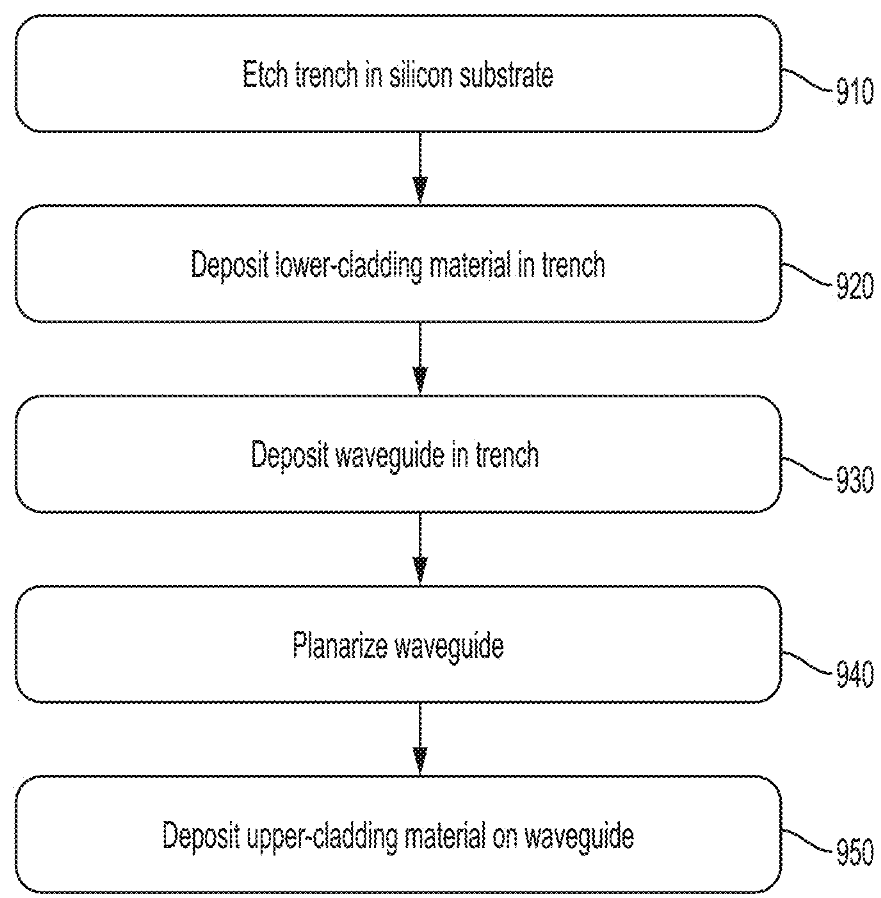
FIG. 9 shows a method of manufacturing a spot size converter, according to a non-limiting embodiment.

Some embodiments of the present application relate to a method of manufacturing a spot size converter having a structure described herein. Any fabrication techniques suitable for silicon-based photonic integrated circuits may be used according to some embodiments. FIG. 9 shows steps of an exemplary method of manufacturing a spot size converter, although other suitable methods and/or additional steps may be used to form the spot size converters described above. Method 900 may start with a silicon substrate. Method 900 may also start with a SOI wafer. Method 900 may also start after formation of the dielectric layer and/or the primary waveguide on the silicon substrate. At act 910, a portion of the silicon substrate may be removed to from a trench, such as by using a suitable etching technique. In some embodiments, act 910 may include removing a portion of the dielectric layer and/or other layers (e.g., a BOX layer and/or a silicon device layer) to form the trench. The trench may be formed at the wafer-level prior to the formation of individual semiconductor chips by dicing the wafer. Therefore, the dimensions of the trench (and thus the dimensions of the lower-cladding material and/or the waveguide deposited in the trench) can be easily varied without affecting upper-layer fabrication steps. In some embodiments, the trench may be formed by removing a portion of the silicon substrate at a region corresponding to what will become an edge of a PIC after dicing of the PIC from the wafer. In some embodiments, the portion of the silicon substrate removed may provide a trench to multiple semiconductor chips on the wafer. For example, neighboring semiconductor chips on a wafer may share an etched silicon substrate region, which upon dicing of the wafer results in each semiconductor chip having a trench.

At act 920, a lower-cladding material is deposited in the trench. The lower-cladding material can be deposited along the upper surface of the trench, including the upper surface of the walls and bottom surface of the trench. For example, as shown in FIGS. 2-4, the lower-cladding material 208 is deposited such that it covers the upper surface of the sides and the bottom of the trench 204.

At act 930, the waveguide is deposited in the trench. The waveguide can be deposited such that it fills an area inside of the lower-cladding material. For example, as shown in FIGS. 2-4, the waveguide 202 fills the area of the trench 204 inside of the lower-cladding material 208. In some embodiments, the trench is etched and the waveguide is deposited before other waveguides are formed on the chip. In some examples, the waveguide is deposited in one step, which can allow more control over the refractive index and/or uniformity of the waveguide material. In some embodiments, the layer forming the waveguide is deposited, and then the waveguide is formed by etching. In some embodiments, another cladding layer can be deposited before the planarization.

At act 940, the waveguide is planarized. In some embodiments, the waveguide is planarized through chemical mechanical polishing (CMP). As a result, the top surface of the waveguide may be substantially planar (e.g., parallel) with the surface of the substrate (and/or layers on top of the substrate). In some embodiments, the planarizing can include planarizing the lower-cladding material in the trench. For example, as shown in FIGS. 2-4, the lower-cladding material 208 and waveguide 202 can be planarized (e.g., through CMP) so that the lower-cladding material 208 and/or waveguide 202 may have upper surfaces substantially planar (or parallel) with the substrate surface.

As discussed herein, in some embodiments the trench etch could include other dielectric layers besides the substrate. For example, it could include a BOX layer and silicon device layer of a SOI wafer. Therefore, in some embodiments, the lower-cladding material and/or waveguide may be planarized with a top-most layer of the substrate.

In some embodiments, additional steps may be included after the etching, prior to depositing an upper-cladding material as discussed in conjunction with act 950. In some embodiments, the waveguide and/or the lower-cladding material can be patterned. For example, a full step etch can be performed through the waveguide, an over-etch can be performed into or through the lower-cladding material, or a partial etch of the waveguide, or multiple steps of etching of the waveguide with different heights. Therefore, in some embodiments the waveguide can be etched to define the waveguide separately from the trench and/or the lower-cladding material. For example, the waveguide 702 and 802 in FIGS. 7 and 8, respectively, is etched to define a space between the waveguide sides 702A and 702B and the trench 204. As also shown in FIGS. 7 and 8, the lower-cladding 704 is also etched such that the lower-cladding is only disposed below the core 702, 802.

At act 950, an upper-cladding material is deposited on the waveguide. The upper-cladding material may be deposited on the waveguide, the lower-cladding material, and/or the trench. In some embodiments, the upper-cladding material is only deposited on an upper surface of the waveguide and a portion of the lower-cladding material (e.g., as shown in FIGS. 2-4). In some embodiments, the upper-cladding material is deposited on other portions of the waveguide, as well as the lower-cladding material and portions of the trench. For example, as shown in FIGS. 7-8, the upper-cladding 706 is in deposited on (a) the upper surface and the left and right side surfaces of the waveguide 702, (b) portions of the lower-cladding material, and (c) portions of the trench.

Methods consistent with method 900 may also include, subsequent to act 950, dicing a wafer to create individual photonic devices. Also, formation of a waveguide, such as the second waveguide and/or the third waveguide may be included in the process.

The acts of method 900 shown in FIG. 3 may be implemented at different steps during formation of a wafer having multiple PICs and individual PICs. The ease of fabrication method 900 provides flexibility in the formation of the trench and the waveguide in the trench at any suitable stage during fabrication. The waveguide formed during acts 930 and 940 may act as a coupling waveguide and be configured to couple light to another waveguide of the PIC. In some embodiments, a wafer or individual PIC may undergo one or more metallization processes. Formation of the trench and overlaying waveguide may occur before a metallization process in some embodiments.

It should be appreciated that the waveguide formed in the trench can be used for functions beyond horizontal coupling. Such functions may include wavelength multiplexing and/or demultiplexing, polarization rotation, and temperature insensitive circuits.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. An optical facet coupler, comprising:

a substrate having a trench;

a cladding material disposed in the trench;

a first waveguide disposed at least partially in the trench and on the cladding material; and a second waveguide disposed at least partially outside the trench and optically coupled to the first waveguide, wherein the first waveguide has a first width and the second waveguide has a second width smaller than the first width, and wherein the first width is a largest width at a first cross section of the first waveguide, and the second width is a largest width at a second cross section of the second waveguide.

2. The optical facet coupler of claim 1, wherein the cladding material is a first cladding material, and wherein the optical facet coupler further comprises a second cladding material disposed on top of the first waveguide.

3. The optical facet coupler of claim 2, wherein the first cladding material and the second cladding material comprise a same cladding material.

4. The optical facet coupler of claim 2, wherein the second waveguide is disposed in the second cladding material, wherein:

the second waveguide is in contact with the first waveguide, the second waveguide is separated from the first waveguide by a portion of the second cladding material disposed between the first and second waveguides, or both; and the second waveguide at least partially overlaps with the first waveguide in a vertical direction.

5. The optical facet coupler of claim 4, wherein the substrate is a silicon on insulator (SOI) substrate comprising a buried oxide (BOX) layer disposed on top of a silicon base layer and below the second cladding material, wherein the trench extends through the BOX layer and into the silicon base layer.

6. The optical facet coupler of claim 5, further comprising a silicon layer disposed on top of the BOX layer and below the second cladding material, wherein the trench extends through the silicon layer and the BOX layer, and into the substrate.

7. The optical facet coupler of claim 4, further comprising a third waveguide disposed below the second cladding material, wherein:

the second waveguide is separated from the third waveguide by a portion of the second cladding material disposed between the second and third waveguides; and the second waveguide at least partially overlaps with the third waveguide in the vertical direction.

8. The optical facet coupler of claim 2, wherein the first waveguide comprises first and second sides, an upper surface and a lower surface, and wherein:

the first cladding material contacts the first and second sides and the lower surface of the first waveguide; and the second cladding material contacts the upper surface of the first waveguide.

9. The optical facet coupler of claim 1, wherein the cladding material conforms to a contour of the trench.

10. The optical facet coupler of claim 1, wherein the first waveguide comprises first and second sides, an upper surface and a lower surface, and wherein the cladding material contacts the first and second sides and the lower surface.

11. The optical facet coupler of claim 10, wherein the first waveguide is a multi-layer waveguide.

12. The optical facet coupler of claim 1, wherein the first waveguide comprises first and second sides, an upper surface and a lower surface, and wherein the cladding material contacts only the lower surface.

13. The optical facet coupler of claim 12, wherein the first waveguide is a multi-layer waveguide.

14. A method of manufacturing an optical facet coupler, comprising:

forming a trench in a substrate;

forming a cladding material in the trench;

forming a first waveguide at least partially in the trench and on the cladding material; and forming a second waveguide at least partially outside the trench such that the second waveguide is optically coupled to the first waveguide, wherein the first waveguide has a first width and the second waveguide has a second width smaller than the first width, and wherein the first width is a largest width at a first cross section of the first waveguide, and the second width is a largest width at a second cross section of the second waveguide.

15. The method of manufacturing of claim 14, wherein the cladding material is a first cladding material, and wherein the method further comprises, after forming the first waveguide at least partially in the trench, depositing a second cladding material on top of the first waveguide.

16. The method of manufacturing of claim 15, wherein:

the first waveguide comprises first and second sides, an upper surface and a lower surface; and the first and second sides and the lower surface are in contact with the first cladding material; and the method further comprises planarizing the first waveguide and the first cladding material so that the first waveguide, first cladding material, or both, are substantially planar to a top surface of the substrate.

17. The method of manufacturing of claim 16, wherein the first waveguide comprises first and second sides, an upper surface and a lower surface, the method further comprising:

etching the first waveguide, such that forming the second cladding material on the first waveguide comprises forming the second cladding material on the first and second sides and the upper surface of the first waveguide.

18. The method of manufacturing of claim 15, further comprising depositing a second layer on top of the substrate and below the second cladding material, wherein forming the trench comprises forming the trench such that the trench extends through the second layer and into the substrate.

19. The method of manufacturing of claim 15, wherein forming the first waveguide in the trench comprises forming multiple layers of the first waveguide.

20. The optical facet coupler of claim 1, wherein the first width varies along a propagation axis.

* * * * *